US012639230B2

(12) United States Patent
Jang

(10) Patent No.: US 12,639,230 B2
(45) Date of Patent: May 26, 2026

(54) MEMORY CONTROLLER, METHOD OF DRIVING MEMORY CONTROLLER, AND MEMORY SYSTEM

(71) Applicant: SK hynix Inc., Gyeonggi-do (KR)

(72) Inventor: Eun Soo Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/365,220

(22) Filed: Aug. 4, 2023

(65) Prior Publication Data

US 2024/0264946 A1 Aug. 8, 2024

(30) Foreign Application Priority Data

Feb. 6, 2023 (KR) ........................ 10-2023-0015450

(51) Int. Cl.
*G06F 12/0895* (2016.01)
*G06F 3/06* (2006.01)
(52) U.S. Cl.
CPC ........ *G06F 12/0895* (2013.01); *G06F 3/0613* (2013.01); *G06F 3/0656* (2013.01); *G06F 3/0679* (2013.01); *G06F 2212/7203* (2013.01)

(58) Field of Classification Search
CPC ............. G06F 12/0895; G06F 12/0802; G06F 2212/7203; G06F 13/1668; G06F 3/0656; G06F 3/0659; G06F 3/0613
See application file for complete search history.

(56) References Cited

U.S. PATENT DOCUMENTS

| | | | |
|---|---|---|---|
| 7,010,645 B2 | 3/2006 | Hetzler et al. | |
| 8,423,722 B1* | 4/2013 | Deforest ............... | G06F 3/0688 |
| | | | 711/148 |
| 9,524,121 B2 | 12/2016 | Maeda et al. | |
| 2016/0306552 A1* | 10/2016 | Liu ........................ | G06F 3/0656 |
| 2017/0300239 A1* | 10/2017 | Choi ........................ | G06F 3/068 |
| 2020/0026460 A1* | 1/2020 | Shin ...................... | G06F 3/0679 |
| 2020/0342355 A1* | 10/2020 | Choi ...................... | G06F 3/0679 |

* cited by examiner

*Primary Examiner* — Kalpit Parikh
(74) *Attorney, Agent, or Firm* — IP & T GROUP LLP

(57) ABSTRACT

A memory controller may allocate, to buffer memory, a write data buffer region and a write cache tag (WCT) buffer region corresponding to a write command from a host. The memory controller may store write data and WCTs for the write data in the write data buffer region and the WCT buffer region, respectively.

20 Claims, 10 Drawing Sheets

| WTDB | WCTB |
|------|------|
| DATA (LBA0) | LBA0 |
| DATA (LBA1) | LBA1 |
| DATA (LBA2) | LBA2 |
| | |
| | |
| | |
| | |

FIG. 9A

| WTDB (WTDB(A)) |
| --- |
| DATA (LBA0) |
| DATA (LBA1) |
| |
| |
| |

| WCTB (WCTB(A)) |
| --- |
| LBA0 |
| LBA1 |
| |
| |
| |

| WTDB (WTDB(B)) |
| --- |
| DATA (LBA100) |
| |

| WCTB (WCTB(B)) |
| --- |
| LBA100 |
| |

FIG. 9B

| WTDB |
|---|
| DATA (LBA0) |
| DATA (LBA100) |
| DATA (LBA1) |
| |
| |
| |
| |
| |
| |

| WCTB |
|---|
| LBA0 |
| LBA100 |
| LBA1 |
| |
| |
| |
| |
| |
| |

MEMORY CONTROLLER, METHOD OF DRIVING MEMORY CONTROLLER, AND MEMORY SYSTEM

CROSS-REFERENCES TO RELATED APPLICATION

The present application claims priority under 35 U.S.C. § 119(e) to Korean Patent Application No. 10-2023-0015450, filed on Feb. 6, 2023, which is incorporated herein by reference in its entirety.

BACKGROUND

1. Technical Field

The present technology relates to a memory controller having a function for maintaining the sequence of a write cache tag (WCT) regardless of the sequence of a ready to transfer (RTT), a method of driving the memory controller, and a memory system.

2. Related Art

A memory system performs a data input and output operation in response to a request from a host, that is, an external device, by using a storage device as a storage medium.

Since a logical address that is used by the host is different from a physical address that is used by the storage medium, the memory system may manage a mapping relation between the logical address and the physical address in the form of map data, and may process a read or write request from the host with reference to the map data.

The memory system updates the map data in response to the write or read request from the host. The time that is taken for the memory system to process the write or read request may include the time taken to update the map data, in addition to the time taken to program or read data into or from the storage device.

After the start of the write request, a memory controller of the memory system loads, on a data buffer, write data to be written into the storage device. At the same time, the memory controller may store, in a write cache tag (WCT) buffer, a WCT to identify a state of the write data, such as whether the writing of the data loaded on the data buffer into the storage device has been completed or has not been completed.

SUMMARY

In an embodiment, a memory controller may include a processor configured to allocate, to buffer memory, one or more write data buffer regions and one or more write cache tag (WCT) buffer regions in which one or more write data items from a host and a WCT for the one or more write data items are stored, respectively, in response to one or more write command from the host; and a host controller configured to store the one or more write data items and the WCT in the one or more write data buffer regions and the one or more WCT buffer regions, respectively, wherein the processor may include a buffer memory controller configured to allocate, to the buffer memory, the one or more write data buffer regions and the one or more WCT buffer regions by the one or more write commands.

In an embodiment, a method of driving a memory controller may include requesting, by a host controller that has received a write command, from a processor, information regarding an available size and base address of buffer memory for a ready to transfer (RTT); allocating, by a buffer memory controller of the processor, to the buffer memory, a write data buffer region and write cache tag (WCT) buffer region corresponding to the write command; and storing, by the host controller, write data that have been received from a host and WCTs for the write data in the write data buffer region and the WCT buffer region, respectively.

In an embodiment, a memory system may include a storage device configured to store data; and a memory controller configured to allocate, to buffer memory, a write data buffer region and a write cache tag (WCT) buffer region corresponding to a write command from a host and configured to store write data that have been received in response to the write command and WCTs for the write data in the write data buffer region and the WCT buffer region, respectively.

BRIEF DESCRIPTION OF THE DRAWINGS

FIG. 1 is a diagram of a memory system according to an embodiment of the present disclosure.

FIG. 5 is a diagram illustrating the state in which the memory controller stores write data and WCTs for the write data in a write data buffer region and a WCT buffer region, respectively, according to the first embodiment of the present disclosure.

FIG. 9A is a diagram illustrating the state in which write data and WCTs for the write data have been separated and stored in the buffer memory for each write command according to the second embodiment of the present disclosure.

FIG. 9B is a diagram illustrating the state in which write data and WCTs are stored as the logical block address of the write data are mixed in order of RTTs in a Prior Art.

DETAILED DESCRIPTION

Figure 2:
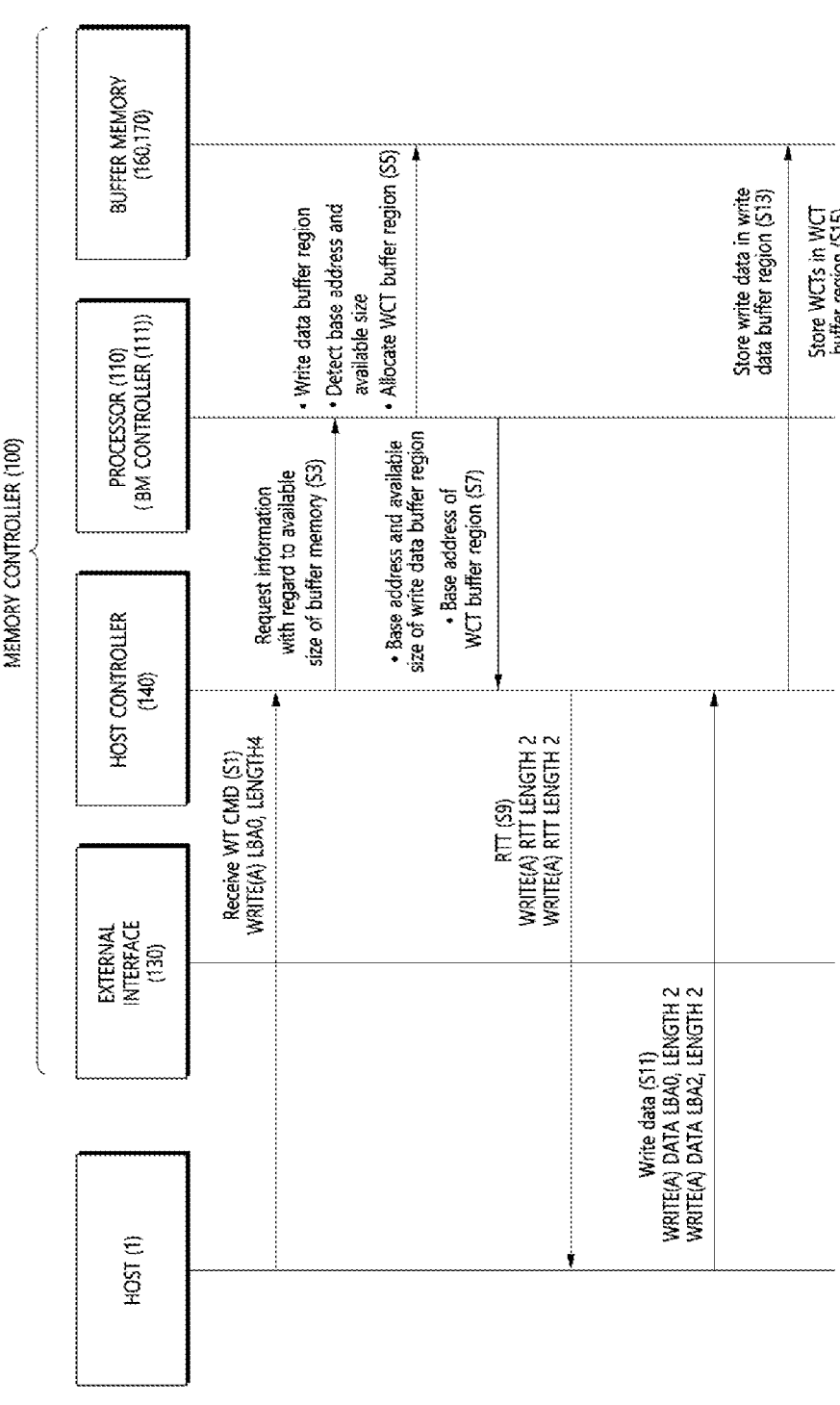
FIG. 2 illustrates a procedure of performing a write command between a host and a memory controller according to the first embodiment of the present disclosure.

Embodiments according to the concept of the present technology may be implemented in various forms and should not be construed as being limited to the embodiments described in this specification.

In this specification, terms, such as a "first" and a "second", may be used to describe a variety of components, but the components should not be limited by the terms. The terms are used to only distinguish one component from the other components. For example, a first component may be referred to as a second component, and likewise a second component may be referred to as a first component without departing from the scope of rights of the present technology.

Terms used in this specification are used to only describe specific embodiments and are not intended to restrict the present technology. An expression of the singular number includes an expression of the plural number unless clearly defined otherwise in the context. In this specification, a term, such as "include" or "have", is intended to designate the presence of a described characteristic, number, step, operation, component, part or a combination of them, and should be understood that it does not exclude the possible existence or addition of one or more other characteristics, numbers, steps, operations, components, parts, or combinations of them in advance.

All terms used herein, including technical terms or scientific terms, have the same meanings as those commonly understood by a person having ordinary knowledge in the art to which the present technology pertains, unless defined otherwise in the specification. Terms, such as those defined in commonly used dictionaries, should be construed as having the same meanings as those in the context of a related technology, and are not construed as ideal or excessively formal meanings unless explicitly defined otherwise in the specification.

Hereinafter, embodiments of the present technology will be described in detail with reference to the accompanying drawings.

Embodiments provide a memory controller having a function for maintaining the sequence of a write cache tag (WCT), which enables write data and the WCT to be separated for each write command regardless of the sequence of a ready to transfer (RTT) and to be stored in order of logical block addresses of the write data, a method of driving the memory controller, and a memory system.

Figure 1:
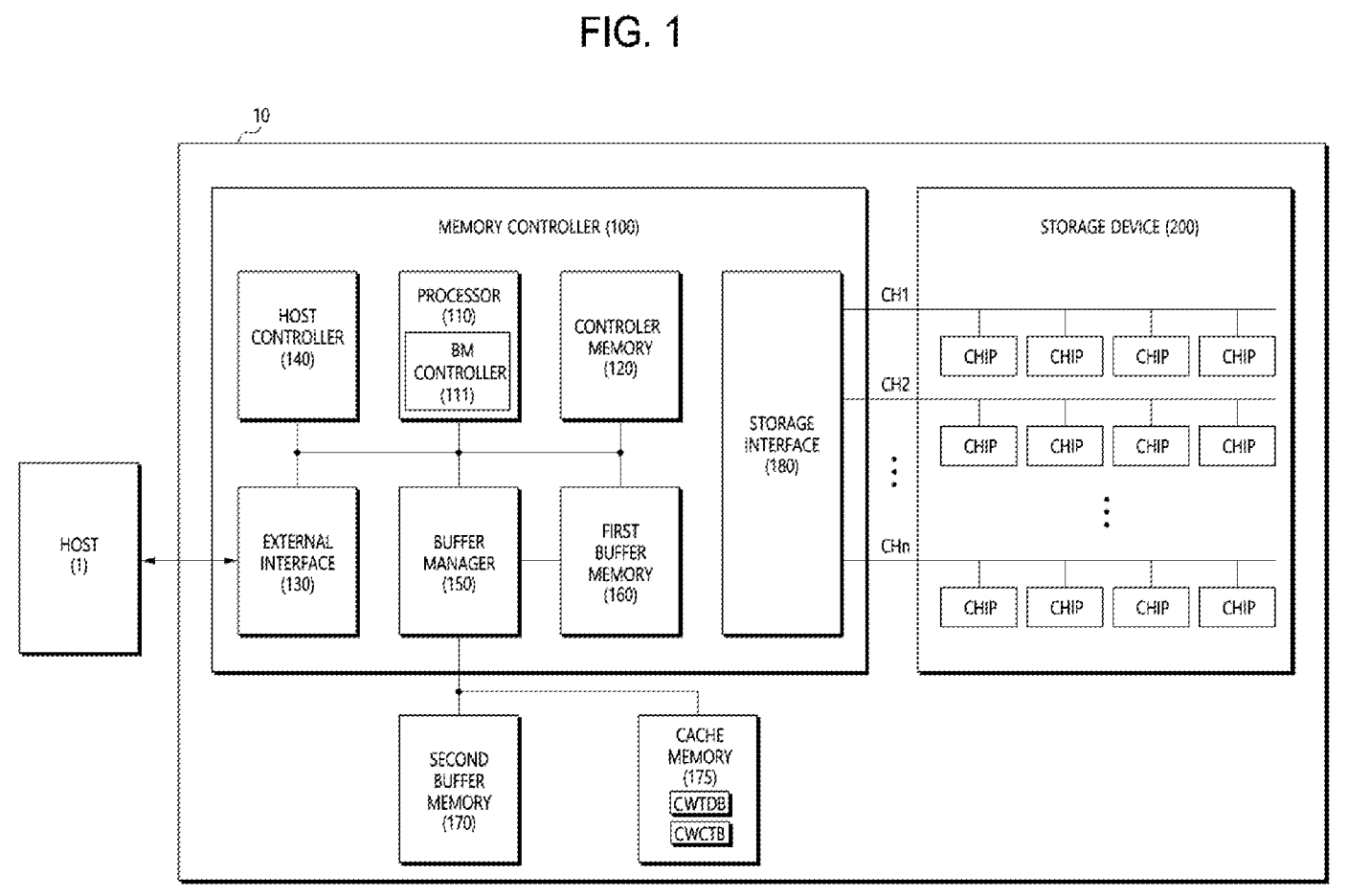

FIG. 1 is a diagram of a memory system 10 according to an embodiment of the present disclosure.

Referring to FIG. 1, the memory system 10 may include a memory controller 100 and a storage device 200. The memory system 10 may include buffer memory. The buffer memory may be integrally implemented in the memory controller 100 (i.e., first buffer memory 160). The buffer memory may be implemented separately from the memory controller 100 (i.e., second buffer memory 170).

The memory system 10 may exchange data with a host 1.

The host 1 may be selected among various types of computing systems, such as a personal computer, a laptop computer, a server computer, a workstation, a tablet PC, a drone, an advanced drivers assistance system (ADAS), smart TV, a smartphone, a medical device, an image display device, a measuring device, an Internet of Things (IoT) device.

Figure 4:
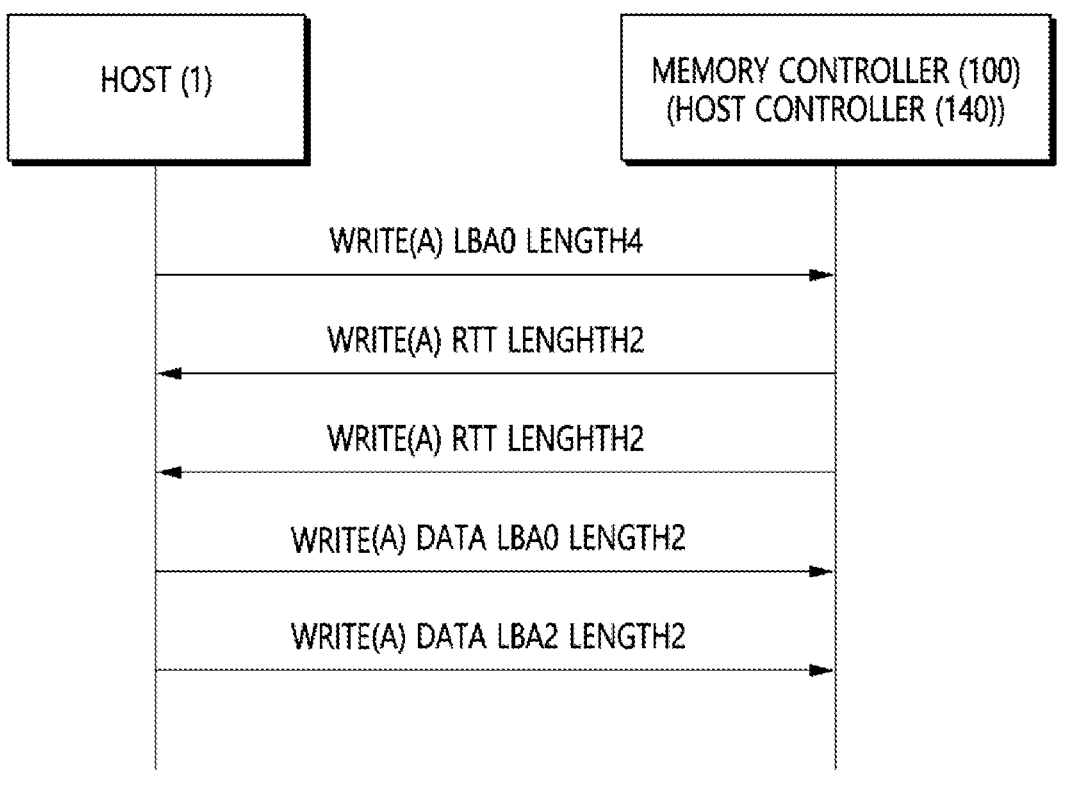
FIG. 4 illustrates a procedure of performing a write command between the host and the memory controller according to the first embodiment of the present disclosure.
Figure 8:
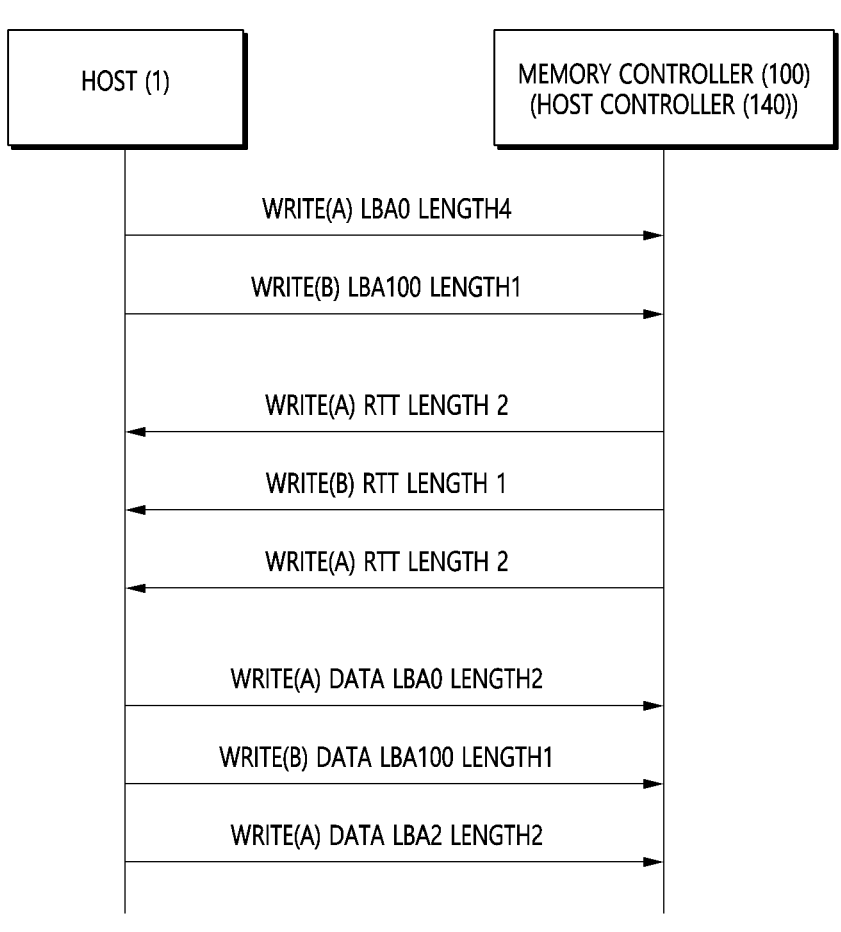
FIG. 8 illustrates a procedure of performing a write command between the host and the memory controller according to the second embodiment of the present disclosure.

The host 1 may transmit a write command WT CMD to the memory system 10. In an embodiment, the write command WT CMD may be WRITE(A) LBA0 LENGTH 4, WRITE(B) LBA100 LENGTH 1, as shown in FIGS. 4 and 8. The WRITE may indicate the write command. The A or B may indicate write data WTD to which an identifier A or B is assigned. The LBA may indicate a logical block address of the write data WTD. The LBA0 may indicate that the logical block address is an address 0. The LBA100 may indicate that the logical block address is an address 100. The LENGTH may indicate the size of the write data WTD. The LENGTH 1 may be 4 KibiByte (KiB). The LENGTH 4 may be 16 KiB.

The storage device 200 may include at least one of a volatile memory device and a nonvolatile memory device. The storage device 200 may be coupled to the memory controller 100 through a plurality of channels CH1 to CHn. The storage device 200 may include a plurality of memory chips CHIP as shown in FIG. 1 or a plurality of packages. The memory controller 100 may control the storage device 200 in response to a request from the host 1. For example, the memory controller 100 may program data into the storage device 200 in response to the write command WT CMD of the host 1. The memory controller 100 may read data that have been written in the storage device 200 in response to a read request from the host 1, and may provide the read data to the host 1.

The memory controller 100 may include at least one processor 110, controller memory 120, an external interface 130, a host controller 140, a buffer manager 150, the buffer memory including the first and second buffer memory 160 and 170, cache memory 175, and a storage interface 180.

The buffer memory may be implemented separately from the memory controller 100 or may be integrated with the memory controller 100.

The processor 110 may control various operations of the memory system 10, including the data reading, data writing, or data management of the storage device 200 or communication of the storage device 200 with the outside. The processor 110 may have a form in which hardware and firmware or software that operates in the hardware have been combined so that the processor 110 can operate as the firmware or software is executed on the hardware.

The processor 110 may include a buffer memory (BM) controller 111.

The BM controller 111 may allocate a write data buffer region WTDB (refer to FIG. 3) and a write cache tag (WCT) buffer region WCTB (refer to FIG. 3) to the buffer memory 160 and 170 for each write command of the host 1. The memory controller 100 may store a WCT to identify the state of the write data WTD in the WCT buffer region WCTB. The WCT may indicate the state of the write data WTD, such as whether the storage of the write data WTD, stored in the write data buffer region WTDB, in the storage device 200 has been completed or has not been completed.

The write data buffer region WTDB may store write data that have been transmitted in response to the write command WT CMD of the host 1. The WCT buffer region WCTB may include a write data cache indicating the state of the write data.

The BM controller 111 may transmit, to the host controller 140, the base addresses of the write data buffer region WTDB and the WCT buffer region WCTB and an available size of the buffer memory, for a ready to transfer (RTT) corresponding to the write command.

The BM controller 111 may be implemented as separate firmware logic, which is to be loaded and executed by the processor 110.

The processor 110 may include a flash translation layer (FTL) for managing the storage device 200.

The FTL may include sector translation (STL), block management (BML), and a low level driver (LLD). The STL may perform map table management for address mapping using a map table, garbage collection, and wear leveling. The BML may perform bad block management and error handling. The LLD may provide a flash interface including a flash recovery algorithm.

The controller memory 120 may store data that is necessary for an operation of the memory controller 100 or data that is generated by the memory controller 100. The controller memory 120 may store a program for control of the storage device 200.

The external interface 130 may provide a communication channel for receiving a command and a clock signal from an external device, i.e., the host 1 and controlling the input and output of data, under the control of the processor 110 or the host controller 140. The external interface 130 may provide a physical connection for communication between the host 1 and the memory system 10. The external interface 130 may be integrated and implemented in the host controller 140.

The external interface 130 may communicate with the host 1 based on an interface that uses at least one of various communication standards or interfaces, such as a universal serial bus (USB) protocol, a multimedia card (MMC) protocol, a peripheral component interconnection (PCI) protocol, a PCI-express (PCIe) protocol, an advanced technology attachment (ATA) protocol, a serial-ATA (SATA) protocol, a parallel-ATA (PATA) protocol, a small computer small interface (SCSI) protocol, an enhanced small disk interface (ESDI) protocol, an integrated drive electronics (IDE) protocol, a private protocol, a system management bus (SM-Bus) protocol, an inter-integrated circuit (I2C) protocol, and an improved inter-integrated circuit (I3C) protocol.

The host controller 140 may control the driving of the external interface 130 for communication with the host 1.

An available size of the buffer memory may be transmitted from the BM controller 111 to the host controller 140. The available size of the buffer memory may be a storage space in which write data can be stored in the buffer memory. The available size of the buffer memory may be the size of each write data buffer region WTDB.

The host controller 140 may be implemented to generate a ready to transfer (RTT) information or RTT including the available size of the buffer memory for each write command and to transmit the RTT to the host 1.

The available size of the buffer memory is included in the RTT. When write data to be transmitted by the host 1 is greater than the available size of the buffer memory, the RTT is transmitted plural times. The number of times that the RTT is transmitted is the number of times that the sum of available sizes of the buffer memory for all transmitted RTTs is greater than the size of the write data.

For example, the RTT may be WRITE(A) RTT LENGTH 2. In this case, the WRITE(A) may indicate an RTT for write data that is indicated as the host(1) A. Further, the RTT may indicate a data transfer request. The LENGTH 2 may indicate the size of the write data buffer region WTDB that has been allocated in order to store the write data WTD having the size of a chunk that consists of a header and a data region. The LENGTH 2 may be 8 KiB, and the LENGTH 4 may be 16 KiB.

The host 1 may divide the write data into one or more write data items so that the one or more write data items have an available size of the buffer memory that is included in the RTT. The host 1 may transmit the divided one or more write data items to the memory system 1 for each RTT. The one or more write data items that have been divided to have the available size of the buffer memory and have been transmitted, and WCTs for the one or more write data items may be stored in each write data buffer region WTDB and each WCT buffer region WCTB that has been generated for each write command, in order of logical block addresses of the write data. When receiving write data corresponding to the write command, the host controller 140 may store the write data in the write data buffer region WTDB. The host controller 140 may store a plurality of divided write data items, which have been received in response to—the plurality of RTTs corresponding to the write command, in the write data buffer region WTDB that has been allocated for each write command. The host controller 140 may store the divided write data items based on the base address of the write data buffer region WTDB. The host controller 140 may store the divided write data items in the write data buffer region WTDB in order of the logical block addresses.

The host controller 140 may store divided write data items having posterior-order logical block addresses, among the divided write data items, in a write data buffer region CWTDB corresponding to the write command that has been allocated to the cache memory 175 based on the base address of the write data buffer region WTDB. The host controller 140 may store, in the cache memory 175, the divided write data items having the posterior-order logical block addresses until divided write data items having prior-order logical block addresses, among the divided write data items, are stored in the write data buffer region WTDB. The divided write data items having the posterior-order logical block addresses may be stored in the write data buffer region CWTDB corresponding to the write command that has been allocated to the cache memory 175 based on the base address of the write data buffer region WTDB.

The host controller 140 may store, in the WCT buffer region WCTB, a WCT indicating the state of the write data that have been stored in the write data buffer region WTDB. The host controller 140 may store the WCT in order of logical block addresses of the write data. Accordingly, WCTs may be stored in the buffer memory in order of the logical block addresses of the write data that have been received regardless of the sequence of the RTTs (refer to FIG. 9A). In a conventional technology, WCTs are mixed and stored in order of RTTs (refer to FIG. 9B).

The host controller 140 that performs the aforementioned operation may be implemented as hardware logic that performs a function for controlling the driving of the external interface 130 and storing write data and a WCT in the buffer memory 160 and 170. The external interface 130 may be integrally implemented in the host controller 140.

The buffer manager 150 may control the buffer memory 160 and 170 under the control of the BM controller 111 of the processor 110 and the host controller 140. In an embodiment, the control of the host controller 140 over the buffer memory 160 and 170 may include dividing buffer memory into a plurality of regions (or slots). In an embodiment, the control of the host controller 140 over the buffer memory 160 and 170 may include allocating or deallocating each region in order to temporarily store data. In an embodiment, the control of the host controller 140 over the buffer memory 160 and 170 may include writing or deleting temporary storage data and managing the use state of data.

The buffer memory may store one or more of a map table, read data, write data, or tag data indicating a data state. The buffer memory may include a plurality of buffer memory components, such as the first buffer memory 160 and the second buffer memory 170. The buffer memory may be controlled by the buffer manager 150. The buffer memory may be used as operating memory of the processor 110, the cache memory 175, and data buffer memory. The buffer memory may store a map table storing map data that is generated in response to a write request from the host 1. The buffer memory may store data that is read from the storage device 200 after the start of a read operation under the control of the buffer manager 150 and may then output the stored read data to the host 1. In an embodiment, the buffer memory may store write data that have been received from the host 1 after the start of a program operation and may then output the stored write data to the storage device 200. The buffer memory may include static RAM (SRAM) or dynamic RAM (DRAM). The write data buffer region WTDB in which the write data WTD and the WCT are separated and stored for each write command and the WCT buffer region WCTB may be allocated to the buffer memory for each write command. In an embodiment, the first buffer memory 160 and the second buffer memory 170 may be buffer memory that is integrally implemented or components of buffer memory that have been separately implemented. In an embodiment, the first buffer memory 160 or the second buffer memory 170 may be selectively implemented inside or outside the memory controller 100.

The cache memory 175 may temporarily store one or more of a program that is loaded for control of the storage device, a map table, read data, write data, or tag data indicative of a state of data. The write data buffer region CWTDB and the WCT buffer region CWCTB may also be allocated to the cache memory 175 in the same manner as the buffer memory. When receiving a plurality of write data items corresponding to a plurality of write commands, the cache memory 175 may temporarily store the write data items that are received in a posterior order. The cache memory 175 may be independently implemented or may be integrated and implemented in the host controller 140 or the buffer memory 160 and 170.

The storage interface 180 may be implemented to communicate with the storage device 200 under the control of the processor 110. The storage interface 180 may provide a communication channel for the transmission and reception of signals between the memory controller 100 and the storage device 200.

The storage interface 180 may communicate an internal command, an address, and data with the storage device 200 through the channel. The storage interface 180 may program, into the storage device 200, write data that has been temporarily stored in the buffer memory under the control of the processor 110. The storage interface 180 may transfer, to the buffer memory, data that is read from the storage device 200.

The storage interface 180 may be implemented to include an error correction (ECC) unit (not illustrated). The ECC unit may perform ECC encoding, based on data that is output to the storage device 200 through the storage interface 180 after the start of a program operation. The ECC-encoded data may be transferred to the storage device 200 through the storage interface 180. The ECC unit may perform ECC decoding on data that is received from the storage device 200 through the storage interface 180.

Figure 3:
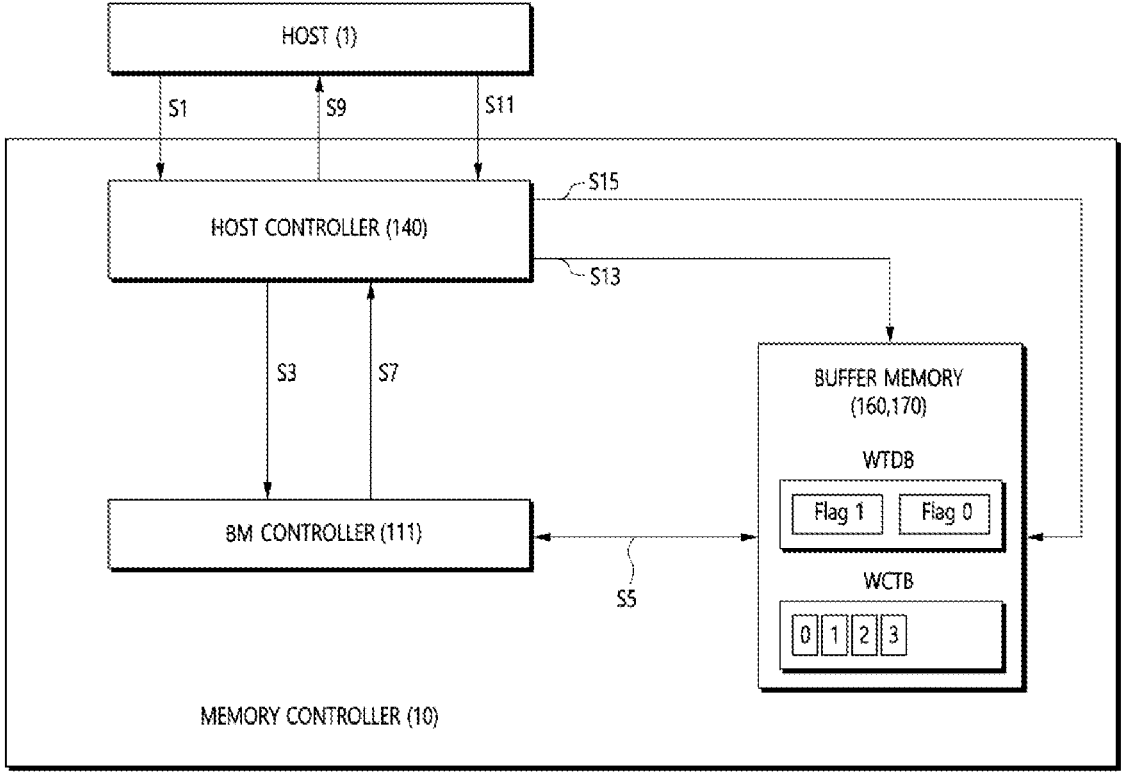
FIG. 3 illustrates a procedure for transmitting and receiving signals and data for write driving between a host controller and a buffer memory controller according to the first embodiment of the present disclosure.

In a first embodiment, a method of driving the memory controller may include requesting, by the host controller that has received a write command, an available size and base address of the buffer memory for an RTT from the processor, allocating, by the BM controller of the processor, the write data buffer region and the WCT buffer region corresponding to the write command to the buffer memory, and storing, by the host controller, write data that have been received from the host and WCTs for the write data in the buffer memory. The storing the write data and the WCT in the buffer memory may include storing, by the host controller, the received write data and the WCT for the write data in the write data buffer region and the WCT buffer region, respectively. FIG. 2 is a diagram illustrating a procedure of performing a write command between the host 1 and the memory controller 100 according to the first embodiment of the present disclosure. FIG. 3 is a diagram illustrating a procedure for transmitting and receiving signals and data for write driving between the host controller 140 and the BM controller 111 according to the first embodiment of the present disclosure. FIG. 4 is a diagram illustrating a procedure of performing the write command WT CMD between the host 1 and the host controller 140 according to the first embodiment of the present disclosure.

Referring to FIGS. 2 to 4, when receiving the write command WT CMD from the host 1 through the external interface 130 (S1), the memory controller 100 may perform a write operation. The write command may be WRITE(A) LBA0 LENGTH 4. The host controller 140 that has received the write command WT CMD from the host 1 may request, from the BM controller 111, information regarding an available size of the buffer memory 160 and 170 in which write data to be transmitted in response to the write command WT CMD will be stored. The information regarding the available size of the buffer memory may include the available size of the buffer memory 160 and 170 in which the write data may be stored and the base address of the buffer memory 160 and 170 (S3).

The BM controller 111 may allocate the write data buffer region WTDB to the available region of the buffer memory 160 and 170, and may detect the base address and available size of the allocated write data buffer region WTDB. The BM controller 111 may allocate, to the buffer memory, the WCT buffer region WCTB corresponding to the write command WT CMD, and may detect the base address of the allocated WCT buffer region WCTB (S5).

The BM controller 111 may transmit, to the host controller 140, the detected available size and base address of the write data buffer region WTDB and the detected base address of the WCT buffer region WCTB (S7).

The host controller 140 may generate an RTT including the available size of the write data buffer region WTDB that has been received from the BM controller 111, and may transmit the RTT to the host 1 (S9).

In the illustrated example of FIG. 4, the RTT may be WRITE(A) RTT LENGTH 2, WRITE(A) RTT LENGTH 2, etc. In this case, the size of the write data may be greater than the available size of the write data buffer region WTDB. In an example of FIG. 2, the RTT for the write command may be transmitted plural times so that a total capacity is greater than the size of the write data, e.g., WRITE(A) RTT LENGTH 2 or WRITE(A) RTT LENGTH 2.

The host 1 that has received the RTT may transmit, to the memory controller 100, write data corresponding to the RTT. The host controller 140 may receive the write data that is transmitted from the host 1 through the external interface 130 (S11).

A size of one or more write data items corresponding to one or more write commands WT CMD may be less than an available size of the buffer memory. In this case, the host controller 140 may receive, from the host 1, the one or more write data items for each RTT. The host controller 140 may store the received one or more write data items and WCTs for the one or more write data items in the write data buffer region WTDB and the WCT buffer region WCTB corresponding to the one or more write commands, respectively, in order that the one or more write data items and the WCTs have been received.

In this case, the size of the write data items may be greater than the available size of the buffer memory that is included in RTT information. In this case, the host 1 may transmit the write data WTD as one or more write data items that have been divided in a plural number so that the write data WTD has the available size of the write data buffer region WTDB. As shown in FIG. 4, the write data of the write command WRITE(A) LBA0 LENGTH 4 greater than the size 2 of the available data buffer may be divided into two divided write data items (i.e., WRITE(A) DATA LBA0 LENGTH 2 and WRITE(A) DATA LBA2 LENGTH 2), and may be transmitted to the host controller 140 of the memory controller 100.

The host controller 140 that has received the write data may sequentially store the received write data in the write data buffer region WTDB that has been previously allocated (S13). At the same time, the host controller 140 may sequentially store, in the WCT buffer region WCTB, the WCTs for the write data that have been stored in the write data buffer region WTDB (S15). The host controller 140 may store the write data and the WCT in the write data buffer region WTDB and the WCT buffer region WCTB that have been allocated for each write command, respectively, in order of logical block addresses (LBA) of the received write data (S15).

FIG. 5 is a diagram illustrating the state in which the host controller 140 stores received write data WTD and WCTs in the write data buffer region WTDB and the WCT buffer region WCTB, respectively, according to the first embodiment of the present disclosure.

The host controller 140 of the memory controller 100 according to the first embodiment may store received write data and WCTs for the write data in order of logical block addresses of the received write data regardless of the sequence of RTTs. The host controller 140 may store the received write data in the write data buffer region WTDB. The host controller 140 may store the WCT in the WCT buffer region WCTB.

Accordingly, the write data and the WCTs may be stored in order of the logical block addresses of the write data regardless of the sequence of the RTTs.

In a second embodiment, a method of driving the memory controller 100 may include requesting, by the host controller that has received a write command, an available size and base address of the buffer memory for an RTT from the processor, allocating, by the BM controller of the processor, a write data buffer region and a WCT buffer region corresponding to the write command to the buffer memory, and storing, by the host controller, the write data that has been received from the host and WCTs for the write data in the write data buffer region and the WCT buffer region, respectively.

The method of driving the memory controller 100 according to the second embodiment may further include transmitting, by the BM controller 111, the base addresses of the write data buffer region WTDB and the WCT buffer region WCTB and an available size of the buffer memory to the host controller 140, generating, by the host controller 140, an RTT including the available size of the buffer memory and transmitting the RTT to the host 1, and receiving, by the host controller 140, write data that have been transmitted by the host 1 and that correspond to the RTT, after allocating the write data buffer region and the WCT buffer region.

The write command may include the logical block addresses of the write data and the length of the write data.

The storing the write data and the WCTs in the buffer memory may include storing the write data and the WCTs in order of the received logical block addresses (LBAs) of the write data.

Figure 6:
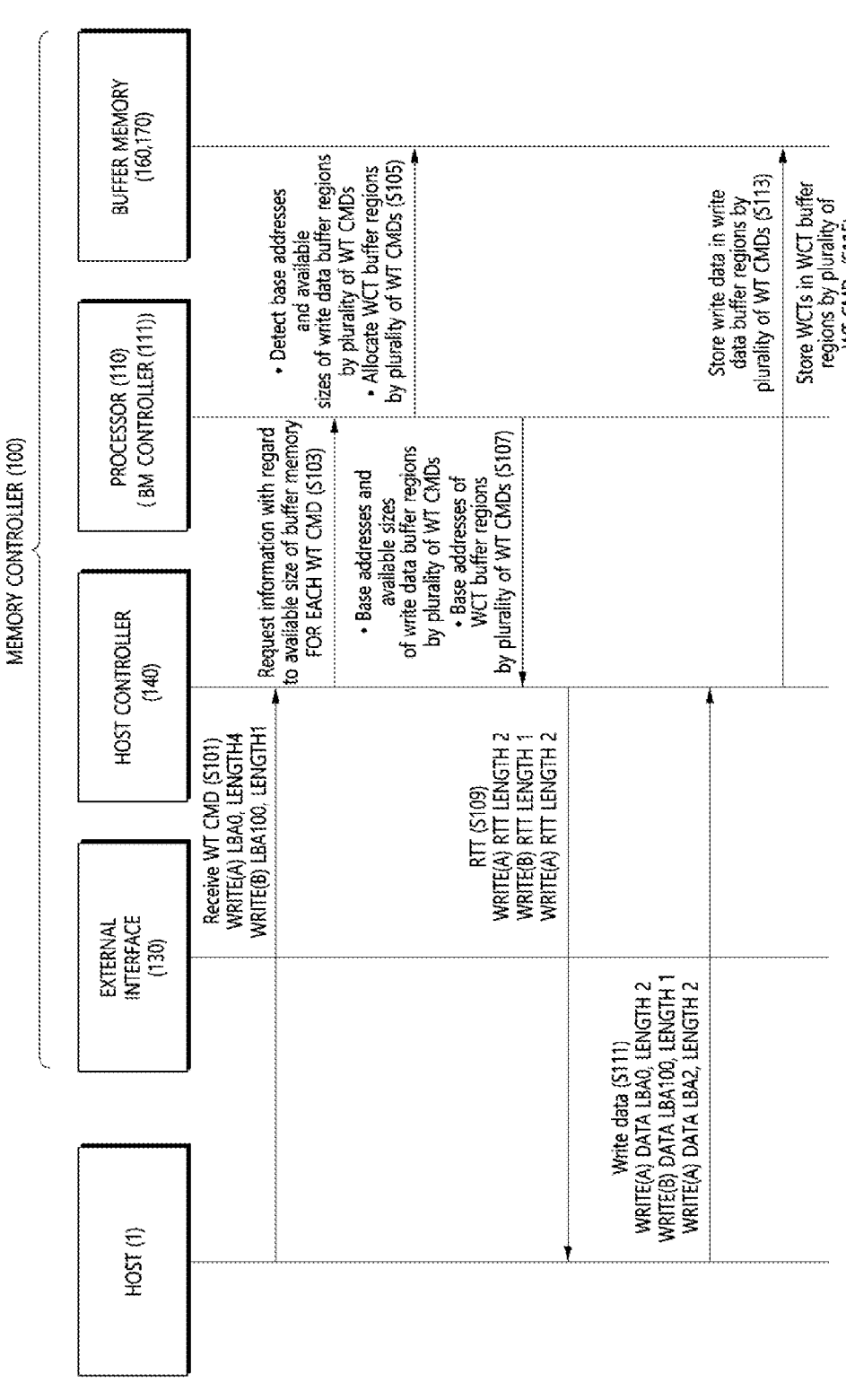
FIG. 6 is a diagram illustrating a procedure of performing a write command between the host and the memory controller according to the second embodiment of the present disclosure.
Figure 7:
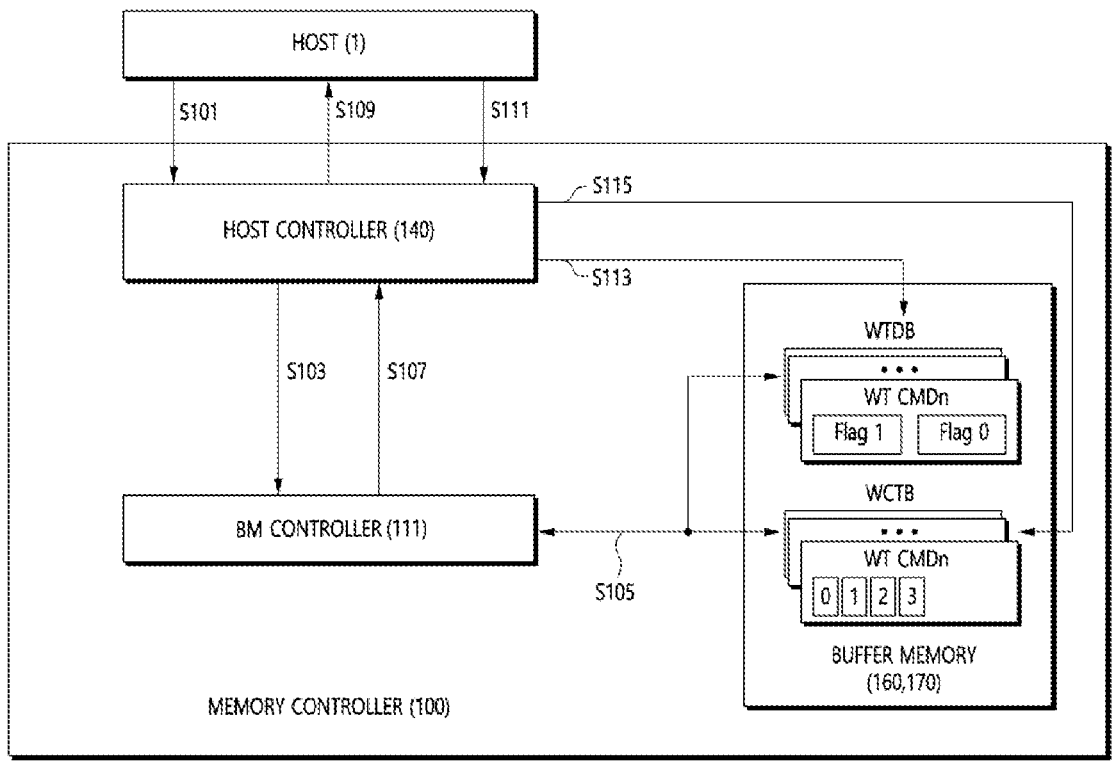
FIG. 7 is a diagram illustrating a procedure for transmitting and receiving signals and data for write driving between the host controller and the BM controller of the processor according to the second embodiment of the present disclosure.

FIG. 6 is a diagram illustrating a procedure of performing a write command between the host and the memory controller according to the second embodiment of the present disclosure. FIG. 7 is a diagram illustrating a procedure for transmitting and receiving signals and data for write driving between the host controller 140 and the BM controller 111 of the processor 110 according to the second embodiment of the present disclosure.

A method of driving the memory controller according to the second embodiment includes receiving, by the host controller 140, one or more write commands WT CMD through the external interface 130, as shown in FIGS. 6 and 7 (S101). The one or more write commands WT CMD may include information regarding the logical block address (LBA) and write data length (LENGTH) of write data. As shown in FIG. 6, the write command WT CMD may be received in a plural number (e.g., WRITE(A) LBA0 LENGTH 4 and WRITE(B) LBA100 LENGTH 1).

The host controller 140 may request from the processor 110 information regarding an available size of the buffer memory 160 and 170 for an RTT (S103). The information with regard to the available size of the buffer memory may include an available size of a data storage region of the buffer memory and a base address, that is, the start address of the data storage region. The BM controller 111 of the processor 110 may allocate, to the buffer memory 160 and 170, the write data buffer region WTDB in which write data will be stored and the WCT buffer region WCTB in which a WCT will be stored, in response to a request for available data information of the buffer memory from the host controller 140 (S105). The data buffer region WTDB and the WCT buffer region WCTB may be separated and allocated for each write command (WT CMD1 to WT CMDn) within the buffer memory 160 and 170.

The BM controller 111 may transmit to the host controller 140, the base addresses of the write data buffer region WTDB and the WCT buffer region WCTB and the available size of the buffer memory for an RTT in the buffer memory 160 and 170 (S107).

The host controller 140 may generate the RTT including the available size of the buffer memory and transmit the RTT to the host 1 (S109).

The RTT that is transmitted in S109 of transmitting the RTT may be divided and transmitted in a plural number when the size of write data is greater than the available size of the buffer memory of the memory controller 100. The RTTs may be transmitted without the sequence of the RTTS for each write command. The number of times that the RTT is transmitted may be the number of times that the sum of available sizes of all RTTs is greater than the size of the write data. The number of times that the RTT is transmitted may be a value that is obtained by adding 1 to the quotient of the available size of the buffer memory divided by the total size of the write data to be transmitted when the quotient or the remainder, that is, a result of the division, is present.

FIG. 8 illustrates a procedure of performing a write command WT CMD between the host 1 and the memory controller 100 according to the second embodiment of the present disclosure.

As shown in FIG. 8, the write command for A write data WRITE(A) may be WRITE(A) LBA0 LENGTH 4. When the available size of the buffer memory is 2, an RTT for the A write data having a total size of 4 (LENGTH 4) may be divided and transmitted in two WRITE(A) RTT LENGTH 2.

The host controller 140 may receive write data that have been transmitted by the host 1 and that correspond to the RTT, in response to the RTT (S111). As shown in FIGS. 6 and 8, the write data that are transmitted by the host 1 may be WRITE(A) DATA LBA0 LENGTH 2, WRITE(B) DATA LBA100 LENGTH 1, and WRITE(A) DATA LBA1 LENGTH 2. When the available size (e.g., LENGTH 2) of the buffer memory for the RTT is less than the size (e.g., WRITE(A) LBA0 LENGTH 4) of the write data corresponding to the write command, the write data that are received may be received by being divided into divided write data items (WRITE(A) DATA LBA0 LENGTH 2 and WRITE(A) DATA LBA1 LENGTH 2) having the available size of the buffer memory.

When receiving the write data corresponding to the RTT, the host controller 140 may store the write data and WCTs for the write data (S113 and S115). S113 and S115 of storing the write data and the WCT may include S113 of sequentially storing, by the host controller 140, the received write data in the write data buffer region WTDB allocated for each write command.

The size of the one or more write data items corresponding to the one or more write commands may be less than an available size of the buffer memory. In this case, the host controller 140 may receive, from the host 1, the one or more write data items for each RTT. Each of the received one or more write data items corresponding to the one or more write commands may be the entire data corresponding to the write command. The host controller 140 may store the received one or more write data items and WCTs for the one or more write data items in the write data buffer region WTDB and the WCT buffer region WCTB corresponding to the one or more write commands, respectively, in order of the received one or more write data.

The size of the one or more write data items corresponding to the one or more write commands may be greater than the available size of the buffer memory. In this case, the host controller 140 may receive, from the host 1, the one or more write data items divided to have the available size of the buffer memory for each RTT. The host controller 140 that has received the one or more write data items may store the divided one or more write data items and WCTs for the divided one or more write data items in the write data buffer region WTDB and the WCT buffer region WCTB, respectively, which have been allocated by the one or more write commands. In this case, the divided one or more write data items and the WCTs may be stored in order of logical block addresses of the divided one or more write data items.

For example, as shown in FIG. 8, the write data may include one or more write data items (e.g., first to n-th write data) corresponding to one or more write commands (e.g., first to n-th write commands WT CMD1 to WT CMDn). The one or more write data items may be received as the one or more write data items (e.g., the first to n-th write data items) that have been divided by one or more RTTs. The one or more first to n-th write data items may be stored in first to n-th write data buffer regions WTDB that have been allocated to the buffer memory 160 and 170 or the cache memory 175 in response to each write command based on each base address of the one or more first to n-th write data items. The one or more first to n-th write data items may be stored in the first to n-th write data buffer region, respectively, in order of logical block addresses (LBAs) of the write data.

Divided one or more write data items having posterior-order logical block addresses may be temporarily stored in the cache memory 175 until divided one or more write data items having prior-order logical block addresses are stored in the write data buffer region WTDB. The posterior-order divided one or more write data items may be temporarily stored in the write data buffer region CWTDB (refer to FIG. 1) that has been allocated to the cache memory 175 by the BM controller 111 of the processor 110, based on the base address of the write data buffer region WTDB. The posterior-order divided one or more write data items may be stored in the write data buffer region CWTDB that has been allocated to the cache memory 175 in order of logical block addresses (LBAs) of the one or more write data. Furthermore, the host controller 140 may store WCTs of the divided one or more write data items having posterior-order logical block addresses in the WCT buffer region CWCTB (refer to FIG. 1) of the cache memory 175. The CWCTB, by the BM controller 111 of the processor 110, may be allocated to the cache memory 175 based on the base address of the write data buffer region WTDB for each write command. WCTs of the posterior-order divided one or more write data items may be stored in the write cache tag buffer region CWCTB in order of logical block addresses (LBAs) of the posterior-order divided one or more write data items. However, the host controller 140 may store WCTs of the posterior-order divided one or more write data items in the write cache tag buffer region WCTB of the buffer memory 160 and 170, in order of logical block addresses (LBAs) of the posterior-order divided one or more write data items, without the BM controller 111 allocating the CWCTB to the cache memory 175.

While the one or more write data items (e.g., the first to n-th write data items) are stored in each write data buffer region WTDB, the remaining received write data items may be temporarily stored in the cache memory 175.

Furthermore, S113 and S115 of storing the write data and WCTs may include S115 of sequentially writing, by the host controller 140, WCTs in the WCT buffer region WCTB that has been allocated for each write command. WCT may be the logical block address (LBA) of each received write data.

FIG. 9A is a diagram illustrating the state in which write data and WCTs for the write data have been separated and stored in the buffer memory 160 and 170 for each write command according to the second embodiment of the present disclosure.

FIG. 9A may illustrate that write data and WCTs are separated and stored in write data buffer regions WTDB (e.g., WTDB(A) and WTDB(B)) and WCT buffer regions WCTB (e.g., WCTB(A) and WCTB(B)), respectively, which have been allocated by a plurality of write commands (e.g., WRITE(A) and WRITE(B), refer to FIG. 6) according to an embodiment. Each of the write data and each of the WCTs may be stored in order of logical block addresses of the write data.

As shown in FIG. 9A, by the processing of a write command in the method of driving the memory controller according to the present technology, write data may be stored in the write data buffer regions WTDB(A) and WTDB(B) that have been separated for each write command, in order of logical block addresses (LBAs) of the write data transmitted from the Host 1. WCTs may also be stored in the WCT buffer regions WCTB(A) and WCTB(B) that have been separated for each write command, in order of logical block addresses (LBAs) of the write data transmitted from the Host 1.

FIG. 9B may illustrate that write data and WCTs are stored as the logical block addresses of the write data are mixed in order of RTTs in a conventional technology.

In FIG. 9B, the WTDB may indicate a write data buffer region, the WCTB may indicate a WCT buffer region.

While the aforementioned process is performed, when receiving the write data, the processor 110 may perform the generation or updates of a map table in which the logical block addresses (LBAs) of the write data and physical block addresses (PBAs) to be stored in the storage device 200 are mapped and stored.

When a condition is satisfied, write data that have been stored in the buffer memory 160 and 170 may be driven by the processor 110 and the storage interface 180, and may be programmed into the storage device 200 by the FTL that performs garbage collection, address mapping, or wear leveling.

The memory controller 100 may sequentially load the received write data onto the write data buffer regions WTDB that have been previously allocated in order of RTTs. WCTs for the received write data may be sequentially stored in the WCT buffer regions WCTB that have been previously allocated. In this case, when write data WRITE(A) and WRITE(B) corresponding to different data commands are received, the write data and WCTs for the write data corresponding to the different write commands may be mixed and stored in the write data buffer regions and the WCT buffer regions as shown in (B) of FIG. 9. This may occur because the write data are not received by one RTT because the size of write data corresponding to each write command is greater than an available size of the buffer memory.

Such a problem may act as a cause to generate an error when data to be stored in the storage device is read from the buffer memory.

Furthermore, the read speed of the buffer memory for a program of the storage device may be reduced because the write data and WCTs for the write data are mixed and stored in the buffer memory.

Accordingly, the speed or efficiency of a write operation of the storage device may also be reduced.

In contrast, the memory controller, the method of driving the memory controller, and the memory system according to the embodiments of the present disclosure can significantly reduce a data error rate when data to be stored in the storage device is read from the buffer memory. Furthermore, write data and WCTs for the write data may be stored in buffer regions that have been separated for each write command within the buffer memory in order of logical block addresses of the write data. Accordingly, the memory controller, the method of driving the memory controller, and the memory system according to the embodiments of the present disclosure can improve the read speed of buffer memory for a program of the storage device. Furthermore, the processing speed of a write command can be significantly improved because the host controller can perform the transmission and reception of RTTs and write data, the storage of write data that have been received in the write data buffer region, and the listing-up of WCTs to the WCT buffer region without control of the processor.

The embodiments described in this specification and the accompanying drawings merely illustrate some of the technical spirit included in the present technology. Accordingly, the embodiments disclosed in this specification are not intended to limit the technical spirit of the present technology but illustrate the technical spirit of the present technology. Accordingly, it is evident that the scope of the technical spirit of the present technology is not restricted by the embodiments. All modified examples and detailed embodiments which may be easily inferred by those skilled in the art without departing from the scope of the technical spirit included in the specification and drawings of the present technology should be construed as being included in the scope of rights of the present technology.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art. Furthermore, the embodiments may be combined to form additional embodiments.

What is claimed is:

1. A memory controller comprising:
a processor configured to allocate, to a buffer memory, a plurality of write data buffer regions and a plurality of write cache tag (WCT) buffer regions corresponding to each of a plurality of write commands from a host; and
a host controller configured to store a plurality of write data items and a plurality of write cache tags (WCTs) for the plurality of write data items in the plurality of write data buffer regions and the plurality of WCT buffer regions, respectively,
wherein the plurality of write data buffer regions corresponding to the each of the plurality of write commands are separated from each other within the buffer memory,
wherein the plurality of WCT buffer regions corresponding to the each of the plurality of write commands are separated from each other within the buffer memory,
wherein the plurality of WCTs are logical block addresses of the plurality of write data items,
wherein, when the plurality of write commands include a first write command for a first write data item of a size greater than an available size of the buffer memory and a second write command for a second write data item of a size less than the available size of the buffer memory, the processor allocates, to the buffer memory, different base addresses to each of a write data buffer region in which the first write data item is to be stored and a write data buffer region in which the second write data item is to be stored.

2. The memory controller of claim 1, wherein the processor comprises a buffer memory controller implemented as firmware logic that is loaded and executed by the processor, and,
wherein the buffer memory controller transmits, to the host controller, information regarding the available size of the buffer memory, a base address of each of the plurality of write data buffer regions, and a base address of each of the plurality of WCT buffer regions.

3. The memory controller of claim 1, wherein
the host controller generates a plurality of ready to transfers (RTTs) for the first write command and one RTT for the second write command, and transmits the plurality of RTTs and the one RTT to the host, and
wherein the processor allocates, to the buffer memory, different base addresses to each of a WCT buffer region in which a WCT for the first write data item is to be stored and a WCT buffer region in which a WCT for the second write data item is to be stored.

4. The memory controller of claim 2, wherein the host controller generates information regarding a ready to transfer (RTT) comprising the available size of the buffer memory and transmits the RTT to the host.

5. The memory controller of claim 4, wherein, when a size of the plurality of write data items corresponding to the plurality of write commands is less than the available size of the buffer memory, when receiving, from the host, the plurality of write data items for each RTT, the host controller stores each of the received plurality of write data items and each of the plurality of WCTs for the plurality of write data items in the plurality of write data buffer regions and the plurality of WCT buffer regions corresponding to each of the plurality of write commands, respectively, in order of the plurality of write data items that have been received.

6. The memory controller of claim 4, wherein when a size of the plurality of write data items corresponding to the plurality of write commands is greater than the available size of the buffer memory, when receiving, from the host, the plurality of write data items divided to have the available size of the buffer memory for each RTT, the host controller stores the divided plurality of write data items and the plurality of WCTs for the divided plurality of write data items in the plurality of write data buffer regions and the plurality of WCT buffer regions that have been allocated by the plurality of write commands, respectively, in order of logical block addresses of the divided plurality of write data items.

7. The memory controller of claim 6, wherein the host controller stores the divided plurality of write data items and the plurality of WCTs for the divided plurality of write data items in relation to base addresses of the plurality of write data buffer regions and the plurality of WCT buffer regions.

8. A method of driving a memory controller, comprising:

allocating, by a processor, to a buffer memory, a plurality of write data buffer regions and a plurality of write cache tag (WCT) buffer regions corresponding to each of a plurality of write commands from a host; and storing, by a host controller, a plurality of write data items and a plurality of write cache tags (WCTs) for the plurality of write data items in the plurality of write data buffer regions and the plurality of WCT buffer regions, respectively, wherein, the plurality of write data buffer regions corresponding to the each of the plurality of write commands are separated from each other within the buffer memory, wherein the plurality of WCT buffer regions corresponding to the each of the plurality of write commands are separated from each other within the buffer memory, wherein the plurality of WCTs are logical block addresses of the plurality of write data items, and wherein, when the plurality of write commands include a first write command for a first write data item of a size greater than an available size of the buffer memory and a second write command for a second write data item of a size less than the available size of the buffer memory, allocating, by the memory controller, to the buffer memory, different base addresses to each of a write data buffer region in which the first write data item is to be stored and a write data buffer region in which the second write data item is to be stored.

9. The method of claim 8, wherein the each of the plurality of write commands comprises a logical block address and information regarding a size of write data.

10. The method of claim 8, further comprising:

requesting, by the host controller, to the processor, the available size of the buffer memory, in response to the plurality of write commands from the host;

transmitting, by the processor, to the host controller, the available size of the buffer memory;

generating, by the host controller, a plurality of ready to transfers (RTTs) for each of the plurality of write commands based on the available size of the buffer memory and transmitting the plurality of RTTs to the host; and receiving, by the host controller, from the host, the plurality of write data items corresponding to each of the plurality of RTTs.

11. The method of claim 10, wherein storing the plurality of write data items and the plurality of WCTs in the buffer memory comprises:

storing, by the host controller, each of received plurality of write data items and each of the plurality of WCTs for the plurality of write data items in the write data buffer region and the WCT buffer region corresponding to each of the plurality of write commands, respectively, in order of the plurality of write data items that have been received, when receiving the plurality of write data items for each RTT from the host when a size of the plurality of write data items corresponding to the plurality of write commands is less than the available size of the buffer memory.

12. The method of claim 10, wherein storing of the received plurality of write data items and the plurality of WCTs in the buffer memory comprises:

storing, by the host controller, a divided plurality of write data items and WCTs for the divided plurality of write data items in the write data buffer region and the WCT buffer region that have been allocated by the plurality of write commands, respectively, in order of logical block addresses of the divided plurality of write data items, when a size of the plurality of write data items corresponding to the plurality of write commands is greater than the available size of the buffer memory, when receiving, from the host, the plurality of write data items divided to have the available size of the buffer memory for each RTT.

13. The method of claim 8, further comprising:

generating, by the host controller, a plurality of ready to transfers (RTTs) for the first write command and one RTT for the second write command;

transmitting, by the host controller, the plurality of RTTs and the one RTT to the host; and allocating, by the memory controller, to the buffer memory, different base addresses to each of a WCT buffer region in which a WCT for the first write data item is to be stored and a WCT buffer region in which a WCT for the second write data item is to be stored.

14. A memory system comprising:

a plurality of memories configured to store data; and a memory controller configured to allocate, to a buffer memory, a plurality of write data buffer regions and a plurality of write cache tag (WCT) buffer regions corresponding to a plurality of write commands from a host and configured to store a plurality of write data items that have been received in response to the plurality write commands and a plurality of write cache tags (WCTs) for the plurality of write data items in the plurality of write data buffer regions and the plurality of WCT buffer regions, respectively, wherein, the plurality of write data buffer regions corresponding to the each of the plurality of write commands are separated from each other within the buffer memory, wherein the plurality of WCT buffer regions corresponding to the each of the plurality of write commands are separated from each other within the buffer memory, wherein the plurality of WCTs are logical block addresses of the plurality of write data items, wherein, when the plurality of write commands include a first write command for a first write data item of a size greater than an available size of the buffer memory and a second write command for a second write data item of a size less than the available size of the buffer memory, the processor is configured to allocate, to the buffer memory, different base addresses to each of a WCT buffer region in which a WCT for the first write data item is to be stored and a WCT buffer region in which a WCT for the second write data item is to be stored.

15. The memory system of claim 14, wherein the memory controller comprises:

a processor configured to allocate the plurality of write data buffer regions and the plurality of WCT buffer regions, each corresponding to the plurality of write commands, to the buffer memory; and a host controller configured to store each of the plurality of write data items in a corresponding write data buffer region, and configured to store each of the plurality of WCTs for the plurality of write data items in a corresponding WCT buffer region.

16. The memory system of claim 15, wherein the host controller requests, to the processor, the available size of the buffer memory, based on the plurality of write commands received from the host, wherein the processor transmits, to the host controller, the available size of the buffer memory.

17. The memory system of claim 16, wherein the host controller generates information regarding a ready to transfer (RTT) comprising the available size of the buffer memory and transmits the RTT to the host.

18. The memory controller of claim 17, wherein when a size of the plurality of write data items corresponding to the plurality of write commands is less than the available size of the buffer memory, when receiving, from the host, the plurality of write data items for each RTT, the host controller stores each of the received plurality of write data items and each of the plurality of WCTs for the plurality of write data items in the write data buffer region and the WCT buffer region corresponding to each of the plurality of write commands, respectively, in order of the plurality of write data items that have been received.

19. The memory system of claim 17, wherein when a size of plurality of write data items corresponding to the plurality of write commands is greater than the available size of the buffer memory, when receiving, from the host, the plurality of write data items divided to have the available size of the buffer memory for each RTT, the host controller stores the divided plurality of write data items and WCTs for the divided plurality of write data items in the write data buffer region and the WCT buffer region that have been allocated by the plurality of write commands, respectively, in order of logical block addresses of the divided plurality of write data items.

20. The memory system of claim 14, wherein the host controller generates a plurality of ready to transfers (RTTs) for the first write command and one RTT for the second write command, and transmits the plurality of RTTs and the one RTT to the host, and wherein the processor allocates, to the buffer memory, different base addresses to each of a write data buffer region in which the first write data item is to be stored and a write data buffer region in which the second write data item is to be stored.

* * * * *